United States Patent
Chou et al.

(10) Patent No.: US 7,774,171 B2
(45) Date of Patent: Aug. 10, 2010

(54) METHODS FOR OPTIMIZING PARAMETERS OF GAS TURBINE ENGINE COMPONENTS

(75) Inventors: Chen-Yu Jack Chou, Cincinnati, OH (US); Ching-Pang Lee, Cincinnati, OH (US); David Charles Wisler, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 11/747,351

(22) Filed: May 11, 2007

(65) Prior Publication Data

US 2008/0281562 A1 Nov. 13, 2008

(51) Int. Cl.
*G06G 7/48* (2006.01)
(52) U.S. Cl. .................... 703/1; 703/8; 703/9
(58) Field of Classification Search .......... 703/1, 703/2, 6–9
See application file for complete search history.

(56) References Cited

U.S. PATENT DOCUMENTS

| 6,462,544 | B1 | 10/2002 | McKinnon | |
|---|---|---|---|---|
| 7,509,240 | B2* | 3/2009 | Das et al. ................ | 703/1 |
| 2008/0164874 | A1* | 7/2008 | White et al. ................ | 324/316 |

OTHER PUBLICATIONS

Amano et al. T. Flow Visualization of Coolant in Cable-In-Conduit Conductor, IEEE Transactions on Magnetics, vol. 27, No. 2, Mar. 1991, pp. 2112-2115.*
Elkins et al., C.J. Full-Field Velocity and Temperature Meausrments Using Magnetic Resonance Imaging in Turbulent Complex Internal Flows, International Journal of Heat and Fluid Flow, vol. 25, Iss. 5, Oct. 2004, pp. 702-710.*

* cited by examiner

*Primary Examiner*—Russell Frejd
(74) *Attorney, Agent, or Firm*—Bryn T. Lorentz; William Scott Andes; General Electric Co.

(57) ABSTRACT

Methods for optimizing at least one operating parameter of an engine component using an experimentally measured 3D flow field involving providing a magnetic resonance imaging machine, providing a model of an engine component, placing the model into the magnetic resonance imaging machine with a fluid flow source for applying an external fluid flow, applying the external fluid flow to the model, collecting data related to the external fluid flow about the model, and optimizing at least one operating parameter of the component using the data.

15 Claims, 2 Drawing Sheets

METHODS FOR OPTIMIZING PARAMETERS OF GAS TURBINE ENGINE COMPONENTS

TECHNICAL FIELD

Embodiments described herein generally relate to methods for optimizing at least one operating parameter of an engine component. More particularly, embodiments herein generally describe methods for optimizing at least one operating parameter of an engine component using an experimentally measured 3D fluid flow field generated by a magnetic resonance imaging machine.

BACKGROUND OF THE INVENTION

Gas turbine engines, such as those utilized in aircrafts, operate at high temperatures to maximize efficiency and thrust. Such temperatures can place the engine, its various modulated systems, and parts thereof, under tremendous thermal stress, which can lead to fatigue, wear, and in some instances, failure.

Internal and external fluid velocities of gas turbine engines can impact both individual parts as well as overall system efficiency. However, measuring fluid flow in components having complex internal passages is often complicated by the fact that such devices typically have multiple regions of flow separation and strong secondary flows. To fully understand these flows, three-dimensional (3D) fluid velocity data must be collected for a large number of points. In some engine tests, it is not uncommon for several hundred flow measurement instruments to be used to obtain enough data points for the full fluid flow of the engine to be properly studied and characterized. However, this large number of instruments can lead to technical problems such as fluid flow blockage due to the intrusiveness of the instruments.

Another means by which to obtain this data is computational fluid dynamics, or CFD. Unfortunately, the computer resource requirements and the fidelity of boundary conditions needed to quantify the 3D fluid flow through a complex passage can often be limiting factors. Other flow measuring systems currently used in conjunction with gas turbine engines generally include two-dimensional techniques such as Pitot tube, hot wire, Laser Doppler Anemometry (LDA) and Particle Imaging Velocimetry (PIV), each of which may have associated issues. For example, the Pitot tube and hot wire devices may often be intrusive and the measurement provided is point-by-point rather than encompassing the entire fluid flow field. In contrast, while both LDA and PIV may be non-intrusive techniques, both require particle seeding, which uses light to trace the path of particles placed in the fluid flow and works on the assumption that the particles will follow the fluid flow. Thus, there is a need for improved fluid measurement techniques.

Recently, four dimensional magnetic resonance velocimetry, or MRV, such as that used in medical diagnostic applications and full body scans, has been investigated for its effectiveness in measuring internal fluid flow. See Elkins, C. J. et al., *4D Magnetic resonance velocimetry for mean velocity measurements in complex turbulent flows, Experiments in Fluids*, 34 (2003) pp. 494-503. MRV can be a desirable alternative to the previously discussed techniques as it is non-invasive and has been used in the past for both low and high Reynolds number studies. See Elkins citing Fukushima, E., *Nuclear magnetic resonance as a tool to study flow, Annual Review of Fluid Mechanics*, 31 (1999) pp. 95-123). MRV has been coupled with the rapid prototyping processes of stereolithography and fused deposition machining to study turbulent flows in complex internal geometries, specifically within a serpentine cooling passage of a stationary turbine blade. See Id.

MRV works by utilizing a four-dimensional pulse sequence. See Elkins citing Markl, M. et al., *Time resolved three dimensional phase contrast MRI (4D-flow)*, *Journal of Magnetic Resonance Imaging* (2003). In general, MRV involves using both a 3D cine sequence and 3-directional velocity encoding to simultaneously generate a time-resolved series of 3D magnitude images and three-component velocity information. Within each gating cycle, one spatial phase encoding step along the y-direction is used for all acquired time frames. All velocity measurements necessary for the three-directional flow information and a selectable number of spatial encodings along the z-direction are interleaved. The net result is a flexible trade-off between temporal resolution of the images and total acquisition time. See Id.

MRV does, however, still produce data errors that need to be addressed. For instance, to reduce velocity errors unrelated to fluid flow, two scans—one with the flow on and one with the flow off—can be used. Eddy currents and other sources of off-resonance effects, such as gradient field-related system imperfections, can lead to errors in velocity measurements. To account for these errors, the entire measurement process can be repeated without flow but with otherwise identical parameters. Subtraction from the data set containing the velocity information can then be used to eliminate cumulative velocity errors. See Elkins citing Markl, M. et al., *Analysis and correction of the effect of spatial field distortions on velocity measurements with phase contrast MRI, Proc. Of the $10^{th}$ Scientific Meeting of the International Society for Magnetic Resonance in Medicine*, Honolulu, USA, May 18-24, 2002.

Additionally, nonlinearities in the gradient magnetic fields used to encode the velocity can result in errors in the velocity maps. Such imperfections can introduce errors in velocity measurements by altering the gradient moment used to encode flow or motion. Any change from the ideal local gradient can be directly reflected by the same percentage change in the gradient moment and thus, the velocity encoding. However, since the spatial distortions of the gradient field are known, the measured velocities can be retrospectively corrected. See Id.

Thus, while current MRV practices allow internal flow velocities of complex stationary passages to be studied, there remains a need for similarly non-intrusive methods by which to measure and optimize the fluid flow path of the entire gas turbine engine, as well as modulated engine systems and parts thereof, including both stationary and rotatable components.

BRIEF DESCRIPTION OF THE INVENTION

Embodiments herein generally relate to methods for optimizing at least one operating parameter of an engine component using an experimentally measured 3D flow field comprising providing a magnetic resonance imaging machine, providing a model of an engine component, placing the model into the magnetic resonance imaging machine with a fluid flow source for applying an external fluid flow, applying the external fluid flow to the model, collecting data related to the external fluid flow about the model, and optimizing at least one operating parameter of the component using the data.

Embodiments herein also generally relate to methods for optimizing at least one operating parameter of an engine component using an experimentally measured 3D flow field comprising providing a magnetic resonance imaging machine, providing a model of a component having at least one rotatable part, placing the model into the magnetic resonance imaging machine with a fluid flow source, applying the fluid flow to the model, collecting data related to the fluid flow, and optimizing at least one operating parameter of the component using the data.

Embodiments herein also generally relate to methods for optimizing at least one operating parameter of an engine component using an experimentally measured 3D flow field comprising providing a magnetic resonance imaging machine, providing a model of a component having at least one rotatable part, placing the model into the magnetic resonance imaging machine with a fluid flow source for applying an external fluid flow, applying the external fluid flow to the model, collecting data related to the external fluid flow about the model, and optimizing at least one operating parameter of the component using the data.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to methods for optimizing fluid flow in gas turbine engines, modulated engine systems and parts thereof. In general, such methods may involve optimizing at least one parameter of an engine component using an experimentally measured 3D flow field by providing a magnetic resonance imaging machine, providing a model of a component, which may have at least one rotatable part, placing the model into the magnetic resonance imaging machine with a fluid flow source for applying an external fluid flow and/or or and internal fluid flow, applying the fluid flow to the model, collecting data related to the fluid flow about the model, and optimizing at least one operating parameter of the component using the data.

Figure 1:
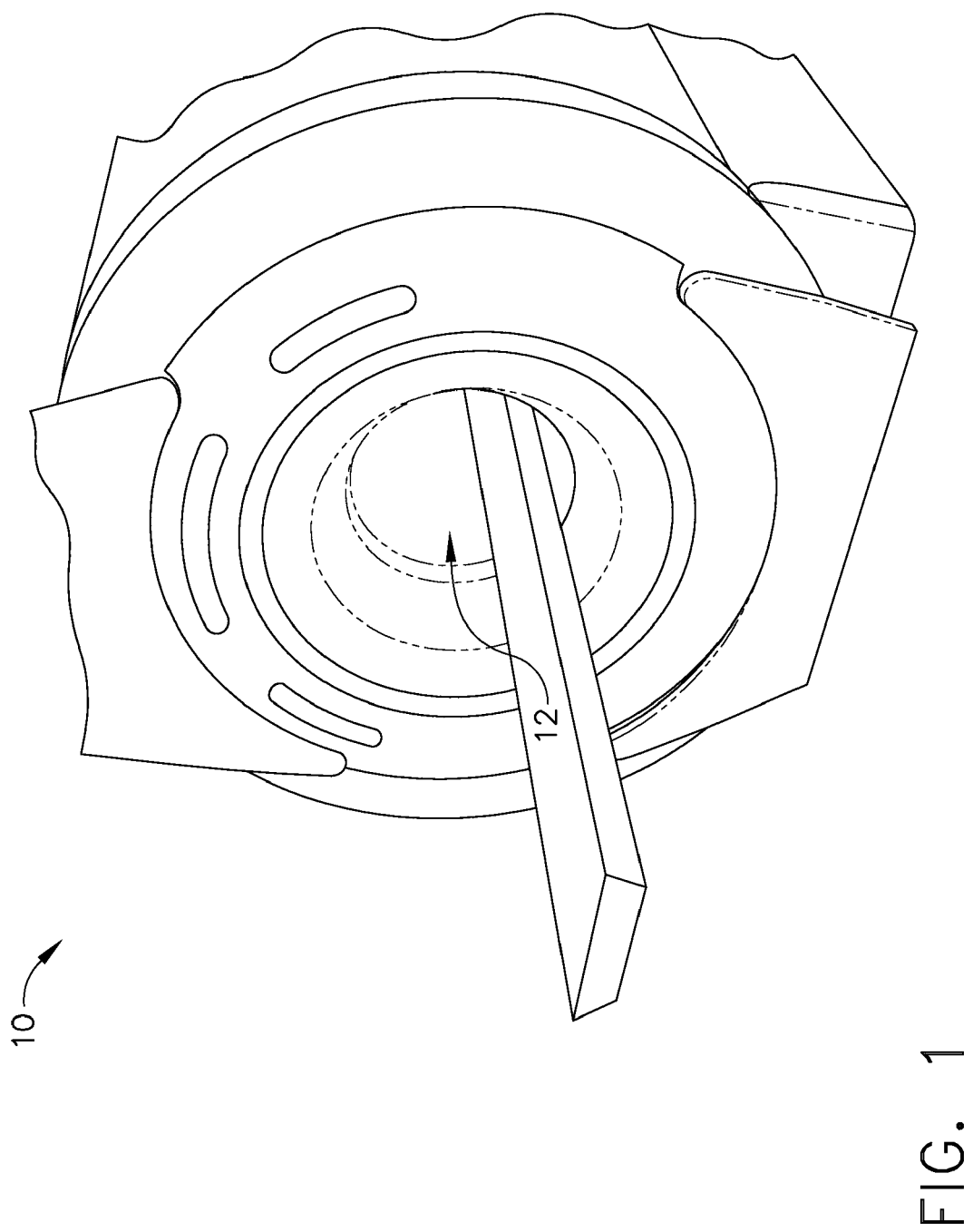
FIG. 1 is a schematic view of one embodiment of a conventional magnetic resonance imaging (MRI) machine in accordance with the description herein.

The methods set forth herein initially involve providing a magnetic resonance imaging (MRI) machine 10, as shown generally in FIG. 1. Any conventional MRI machine may be used herein, however, one example is the 1.5T GE Signa® CV/I MRI scanner (General Electric Co.). See also U.S. Pat. No. 6,462,544 to McKinnon. MRI machine 10 may include a cavity 12 into which the component model being analyzed may be placed, as described herein below.

Next, a component model, which may comprise any of the entire engine, a modulated engine system, or one or more parts of the modulated engine system, can be fabricated. Any rapid prototyping process known to those skilled in the art, such as stereolithography or fused deposition machining, is acceptable for use herein to construct the model. Other acceptable model fabrication methods may include on-shape casting of a polymer resin onto an existing engine component, as well as conventional machining of a polymer or other non-metallic material to produce the desired component model. Such methods may be desirable as they allow the engine, modulated engine system, or part thereof, to be fabricated relatively rapidly and for a lesser cost than involved in manufacturing a traditional prototype for testing.

As previously mentioned, the methods herein can be useful for analyzing fluid flow for the entire engine, any of its various modulated systems, and parts thereof, including those having at least one rotatable part. Moreover, modulated engine systems may include, but are not limited to, inlet systems, compressor systems, combustor systems, turbine systems, exhaust systems, and combinations thereof. Similarly, parts of modulated engine systems that may be studied using the methods herein can include exhaust pipes, ducts, sumps, hydraulic pumps, cooling circuits, nacelle compartment circuits, engine gear surfaces, internal cavities of the previously listed parts, and combinations thereof.

Figure 2:
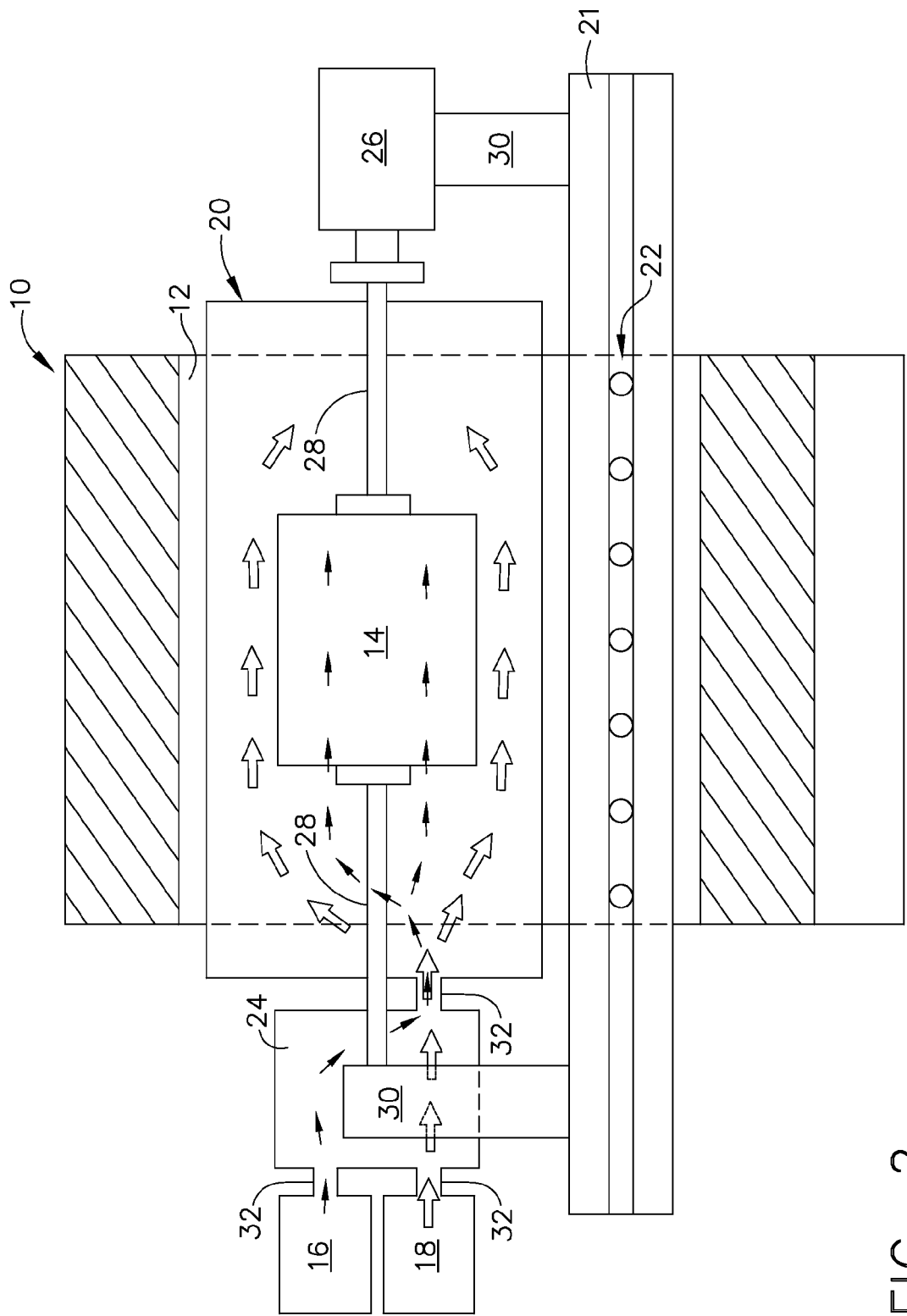
FIG. 2 is a schematic cross-sectional view of one embodiment of the MRI machine of FIG. 1 having a test chamber and component model positioned within the cavity of the machine in accordance with the description herein.

Once model 14 has been fabricated it may be placed inside cavity 12 of MRI machine 10 along with an internal fluid flow source 16 and/or an external fluid flow source 18, as shown in FIG. 2. As used herein, "fluid" can refer to either a liquid or gas. More specifically, before being placed into cavity 12 of MRI machine 10, component model 14 may be placed into a test chamber 20, which can be adjusted to simulate a variety of conditions, as explained herein below. Test chamber 20 may be fabricated from any non-ferrous material, including, but not limited to, fiber reinforced composite, plastic, ceramic, or thermal set resin, and may take a variety of shapes such as, but not limited to, and opened or closed ended cylinder, box, or dome. Test chamber 20 may have any design that is capable of containing component model 14 yet still fitting within machine cavity 12. Test chamber 20 may be placed directly into machine cavity 12 on a non-ferrous test bed 21, which may be supported by a fixed support, or rollers 22, as shown in FIG. 2.

Internal fluid flow refers to flow inside of an engine, modulated engine system, or part thereof, such as for example, flow inside of turbine airfoils. The internal fluid flow source 16 may comprise a pump, tank or other like apparatus capable of containing a fluid or gas and will generally be located externally to MRI machine 10. The fluid may be transferred from internal fluid flow source 16 to a controlled volume test environment conditioner, or CVTE, 24, using any conventional conduit, such as a pipe, tube, filter or other like device 32. From CVTE 24, the internal fluid flow can be passed along to test chamber 20 using another conduit 32. CVTE 24 can be either separate from, or integral with, test chamber 20. The CVTE 24 may be used to precondition the internal fluid flow in accordance with desired test parameters prior to transferring the fluid flow into test chamber 20. For instance, temperature, pressure, speed and fluid density may be altered as desired. Additionally, the CVTE 24 may be used to add such things as color, image contrast enhancers like Gadolinium-based agents, or other chemical additives, as required for the particular testing being carried out.

Water, steam, or other similar environmentally safe liquid or gas, such as inert gases, may serve as the fluid provided to the test chamber 20 from the internal fluid flow source 16. The motion of the fluid can be regulated in a variety of ways. For instance, the motion can be regulated by turning model 14 while it is positioned inside of test chamber 20 using an attached electric motor 26, as shown in FIG. 2 and as described herein below. In this instance, the rotation of model 14 itself serves as a pump to move the fluid through test chamber 20 and model 14 concurrently. Alternately, the motion of the fluid can be regulated by employing a vacuum or pressure differential between two ends or sides of model 14. While the temperature at which the internal fluid flow is applied can be varied as explained herein below, in one embodiment, the internal fluid flow may be regulated in CVTE 24 to a temperature of from about 5° C. to about 250° C. prior to introduction into the test chamber. Those skilled in the art will understand that the temperature of the fluid is limited by only the thermal capability of the model.

External fluid flow refers to flow about a modulated engine system, or part thereof, that still occurs within the structure of the engine, such as flow passing about the external surface of a compressor airfoil. If an external fluid flow source 18 is desired, a pump, tank or other like apparatus capable of containing a fluid or gas may serve as external fluid flow source 18 and will generally be located externally to MRI machine 10. Like the internal fluid flow, water, steam, or other similar environmentally safe fluid may be provided to test chamber 20 by external fluid flow source 18, as shown in FIG. 2. Fluid movement of the external flow can be accomplished by injecting or pumping fluid as described previously, from an external fluid flow source 18, through a conduit 32 and into CVTE 24 for preconditioning. The preconditioned external fluid flow may then be transferred from CVTE 24 to test chamber 20 using another conduit 32. Alternately, external fluid may be moved using a pressure differential at various sites of the test setup, and/or between model 14 and test chamber 20. Similar to the internal fluid flow, the temperature at which the external fluid flow is applied can be varied. However, in one embodiment, the external fluid flow may be preconditioned in CVTE 24 to a temperature of from about 5° C. to about 250° C. prior to introduction into test chamber 20. Those skilled in the art will understand that the temperature of the external fluid is limited by only the thermal capability of model 14.

Those skilled in the art will also understand that if both an internal fluid flow and an external fluid flow are utilized, the internal flow, indicated by small arrows in FIG. 2, and external flow, indicated by large arrows in FIG. 2, may pass through the same CVTE if it is desired that both fluids have the same physical properties. The CVTE can then direct the preconditioned fluid both internally through and externally about model 14, as shown in FIG. 2. Alternately, when the same physical properties are desired for both the internal and external fluid flow, a unitary fluid flow source may be used to supply the fluid to the CVTE for preconditioning. Once again, the CVTE can then direct the preconditioned fluid internally through and externally about model 14. If, however, the internal flow and external flow are to have different physical properties, a separate CVTE may be used to precondition each of the internal flow and the external flow prior to transferring the preconditioned fluids to the test chamber.

Additionally, if the engine, modulated engine system, or part thereof, being analyzed comprises any rotatable parts, external motor 26 may be attached to model 14 to simulate the movement of the rotatable part during use. In this way, motor 26 may be used to both move a rotatable model and regulate internal fluid flow if needed. For example, motor 26 may be coupled to a component model 14 using a non-ferrous shaft 28 such that when activated, motor 26 engages and turns shaft 28, which in turn causes component model 14 to rotate. Any conventional electric motor is acceptable for use herein. In most cases, it will be desirable to position motor 26 outside of MRI machine 10, as shown in FIG. 2, in order to prevent motor 26 from interfering with the magnetic field of MRI machine 10. A support 30 may optionally be used to hold motor 26 and/or shaft 28 in position outside of MRI machine 10.

As the external and/or internal fluid flow is applied to component model 14, data may be collected relating thereto using conventional MRI scanning procedures. More specifically, and as previously discussed, measurements may be performed on any standard MRI machine, such as, for example the GE Signa® MRI system. (General Electric Co.). Parameters for studying the external/internal flow from fully developed low-Reynolds number turbulent flow to highly complex engine internal flows can include, for example, any of the following: time delay from radio frequency excitation to magnetic resonance signal reception, which may generally be set at from about 1 ms to about 10 ms; repetition time from single data acquisition and time between successive measurements, which can generally be set at from about 2 ms to 20 ms; and velocity encoding factor, which can generally be set between about 20 cm/sec and 500 cm/sec. Desired image pixel resolution and data acquisition gating interval can help determine the required test time and image data quality, however, such parameters may be hardware dependent to some extent.

While simply scanning component model 14 can provide valuable data, an additional benefit of using magnetic resonance is that it allows for the simulation of external influences that can impact engine performance. For example, conditions such as wind, rain, ice and sand storms may be simulated. Wind may be simulated by adjusting any of airflow speed from an external fan or blower positioned to provide air to test chamber 20, motor speed, angle of airflow, and combinations thereof. More specifically, altering the angle of airflow can allow for simulation of direct, side, top or bottom flow directions. Rain and ice can be simulated by using a nozzle to inject water droplets or ice particles into test chamber 20 under desired temperature and pressure settings. Sand can be simulated by adding sand particles to the airflow during preconditioning in CVTE 24 prior to directing the airflow in test chamber 20.

Also, altitude changes may be simulated by altering such characteristics as density, temperature, pressure, moisture, and combinations thereof, within the test chamber. For example, a higher altitude may be simulated by reducing the pressure and moisture content within the test chamber while a lower altitude may be simulated by increasing the pressure and moisture content within the test chamber. Such modifications to the physical properties of the fluid flow can be accomplished in CVTE 24 prior to transfer of the fluid into test chamber 20.

Similarly, flight stages, including idle, approach, and take-off, can be simulated by modifying a combination of various factors including any of those previously mentioned, as well as altering the speed of electrical motor 26 to simulate differing engine speeds. In particular, flight stages can be simulated by modifying any of the following, either alone or in combination, test chamber pressure, temperature, and density, airflow speed, moisture, airflow angle, engine model vane, and VABI settings (i.e. a close vane angle results in less airflow and less speed).

Another benefit to using magnetic resonance is that when applying an internal fluid flow, the internal fluid flow can be varied in order to study fluid to structure interactions. In other words, the way in which the fluid flow passes throughout the component model can be analyzed and the model, or placement thereof, may then be optimized based on the findings. While there are numerous ways by which to vary the internal fluid flow, some example can include, but are not limited to, closing or opening at least one stator vane, adjusting at least one variable area by-pass injector angle of an inlet, adjusting at least one variable area by-pass injector angle of an afterburner, adjusting at least one variable area by-pass injector angle of an exhaust system, and any combination thereof. Those skilled in the art will understand that the model can be configured to comprise movable parts to simulate the previously discussed variations, or alternately, different models can be used to simulate different conditions. For example, one model may have one or more stator vanes in the open position, while a second model may have all stator vanes closed. Data can be generated using each model and the results compared.

As another example, a variable cycle engine hyperburner design could be optimized by using variable area bypass injectors and a variable area axisymmetric nozzle. At takeoff, most of the air delivered to the hyperburner comes through the engine core, while at higher Mach numbers, most of the air bypasses the core and travels through the outer region of the fan directly into the afterburner. Using the presently described methods, the variable areas and the length of the bypass injectors can be optimized by analyzing the "smoothness" of the fluid flow, i.e. the less turbulent the flow field, the less fluid separation at the bypass injector and nozzle interface. Similarly, external fluid flow can be varied in order to study and optimize the fluid flow about the external portions of the engine, modulated engine systems, or parts thereof. Again, there are a variety of ways to vary the external fluid flow, including, but not limited to, altering the rotational speed of the electric motor, altering the inlet guide vane settings, altering the VABI angle, and combinations thereof. For example, increasing the rotational speed of the electric motor will result in the model to which it is coupled to also rotate more rapidly, thereby increasing the speed of the external fluid flow about the model.

Still another benefit to using magnetic resonance to study fluid flow is that in one embodiment, the fluid flow through the component can have a Reynolds number ranging from about 1000 to about 10,000,000. Accommodating such a broad range of Reynolds numbers allows for a more thorough analysis of the engine, modulated engine system, or part of the modulated engine system. When fluid flow interacts with a component, such as, for example, a turbine blade or compressor blade, the speed of the flow can vary from a high Reynolds number at the convex surface of the blade to a low Reynolds number at the concave surface of blade. Being able to study the mean measured fluid velocity that is reflected by Reynolds numbers and compare the changes thereto with changes in fluid flow speed can allow for optimization of the component model. Similarly, laminar flow can typically have a lower Reynolds number while turbulent flow can typically have a higher Reynolds number. Reduced turbulent flow equates to less noise, less fluid induced vibration and less rapid cycle fatigue. When viewed in reference to a turbine blade or compressor blade, reduced turbulent flow can also result in longer blade and structural high cycle fatigue life. Therefore, the methods set forth herein can allow for reduced iterative turbine component design cycle time from the current several-month timeframe to mere days or hours. Indeed, an optimized turbine airfoil model having an idealized 3D Reynolds number fluid field could generally be fabricated in less than 8 hours using the previously described stereolithography model fabrication process. In some instances, the entire test setup and data acquisition process could be carried out in less than 24 hours.

By using the previously described methods, a variety of operating parameters of the engine can be optimized. For example, in one embodiment, the operating parameter optimized may be selected from the group consisting of axial spacing between high pressure turbine blade rows and low pressure turbine blade rows, tip clearances of high pressure turbine blades and low pressure turbine blades, number of airfoils, airfoil angle, airfoil contour, engine seal clearance, engine cavity design, cooling circuit design, cooling hole size, and combinations thereof. For example, optimized axial spacing and airfoil chamber angles would produce a "smooth" 3D fluid flow field that has less turbulence and less separation of flow. The "smoothness," of a fluid flow image can be measured by mean fluid flow velocities that are received from the MRI machine using different models and different test settings. The design configuration having the least turbulence, least flow separation, and greatest "smoothness" as reflected by the MRI data generated would typically be chosen as the final optimized design for the component. Those skilled in the art will understand that the previous description is but an example of the operating parameters that can be optimized using the data generated and collected by the methods described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for optimizing at least one operating parameter of an engine component using an experimentally measured 3D flow field comprising:
   providing a magnetic resonance imaging machine;
   providing a model of an engine component;
   placing the model into the magnetic resonance imaging machine with a fluid flow source for applying an external fluid flow;
   applying the external fluid flow to the model, the fluid flow through the component having a Reynolds number of from about 1,000 to about 10,000,000;
   applying an internal fluid flow to the model of the component, the internal fluid flow having a temperature of from about 5° C. to about 250° C.;
   subjecting the model to at least one simulated condition selected from the group consisting of wind, rain, ice and sand storms;
   collecting data related to the external fluid flow, the internal fluid flow, and the affect of the simulated condition; and
   optimizing at least one operating parameter of the component using the data.

2. The method of claim 1 further comprising subjecting the model to simulated altitude changes and collecting data related to the affect of the simulated altitude changes on the model.

3. The method of claim 1 wherein the model further comprises at least one rotatable part.

4. The method of claim 1 further comprising simulating at least one flight stage selected from the group consisting of idle, approach, and takeoff, and collecting data related to the affect of the simulated flight stage on the model.

5. The method of claim 1 comprising varying the internal fluid flow using a method selected from the group consisting of closing a stator vane, opening a stator vane, adjusting variable area by-pass injector angles of an inlet, adjusting variable area by-pass injector angles of an after-burner, adjusting variable area by-pass injector angles of an exhaust system, and combinations thereof.

6. The method of claim 1 wherein the operating parameter optimized is selected from the group consisting of axial spacing between high pressure turbine blade rows and low pressure turbine blade rows, tip clearances of high pressure turbine blades and low pressure turbine blades, number of airfoils, airfoil angle, airfoil contour, engine seal clearance, engine cavity design, cooling circuit design, cooling hole size, and combinations thereof.

7. The method of claim 1 wherein the component is selected from the group consisting of an engine, an engine module system, parts of an engine module system, and combinations thereof.

8. A method for optimizing at least one operating parameter of an engine component using an experimentally measured 3D flow field comprising:
 providing a magnetic resonance imaging machine;
 providing a model of a component having at least one rotatable part;
 placing the model into the magnetic resonance imaging machine with a fluid flow source;
 applying the fluid flow to the model;
 collecting data related to the fluid flow; and
 optimizing at least one operating parameter of the component using the data.

9. The method of claim 8 wherein the fluid flow source applies a fluid flow selected from the group consisting of internal fluid flow, external fluid flow, and combinations thereof.

10. The method of claim 8 wherein the operating parameter optimized is selected from the group consisting of axial spacing between high pressure turbine blade rows and low pressure turbine blade rows, tip clearances of high pressure turbine blades and low pressure turbine blades, number of airfoils, airfoil angle, airfoil contour, engine seal clearance, engine cavity design, cooling circuit design, cooling hole size, and combinations thereof.

11. The method of claim 8 wherein the component is selected from the group consisting of an engine, an engine module system, parts of an engine module system, and combinations thereof.

12. A method for optimizing at least one operating parameter of an engine component using an experimentally measured 3D flow field comprising:
 providing a magnetic resonance imaging machine;
 providing a model of a component having at least one rotatable part;
 placing the model into the magnetic resonance imaging machine with a fluid flow source for applying an external fluid flow;
 applying the external fluid flow to the model;
 collecting data related to the external fluid flow about the model; and
 optimizing at least one operating parameter of the component using the data.

13. The method of claim 12 further comprising applying an internal fluid flow to the model of the component and collecting data related to the internal fluid flow through the model.

14. The method of claim 12 wherein the component is selected from the group consisting of an engine, an engine module system, parts of an engine module system, and combinations thereof.

15. The method of claim 12 wherein the operating parameter optimized is selected from the group consisting of axial spacing between high pressure turbine blade rows and low pressure turbine blade rows, tip clearances of high pressure turbine blades and low pressure turbine blades, number of airfoils, airfoil angle, airfoil contour, engine seal clearance, engine cavity design, cooling circuit design, cooling hole size, and combinations thereof.

* * * * *